United States Patent

[11] 3,568,790

[72] Inventor Edward M. Sankey, Chula Vista, Calif.
[21] Appl. No. 861,849
[22] Filed Sept. 29, 1969
[45] Patented Mar. 9, 1971
[73] Assignee Rohr Corporation

[54] AIR DIVIDER RING STRUCTURE FOR JET ENGINE INLET AIR DUCT
8 Claims, 6 Drawing Figs.

[52] U.S. Cl. .................................................. 181/36, 181/56, 137/15.1
[51] Int. Cl. ............................................ B64d 33/02, F01n 1/10
[50] Field of Search .................................. 137/15.1, 15.2; 181/33, 35, 36, 33.21, 35.1, 46, 56

[56] References Cited
UNITED STATES PATENTS
3,439,774  4/1969  Callaway et al. ............ 181/33.1
3,477,231  11/1969  Paulson ....................... 181/33.21
3,481,427  12/1969  Dobbs et al. ................. 181/33.21

FOREIGN PATENTS
935,119  8/1963  Great Britain ................ 181/33.21

Primary Examiner—Robert S. Ward, Jr.
Attorney—George E. Pearson

ABSTRACT: One or more inlet air dividing, sound absorptive rings are supported coaxially within the inlet duct of a jet engine nacelle on a plurality of radially inwardly extending, streamlined struts. Each sound absorptive ring comprises a plurality of arcuate honeycomb panel sections releasably connected at their lateral edges by piano hinge type connectors to narrow longerons supported by said struts, the panel sections and the longerons comprising complementary segments of each sound absorptive ring.

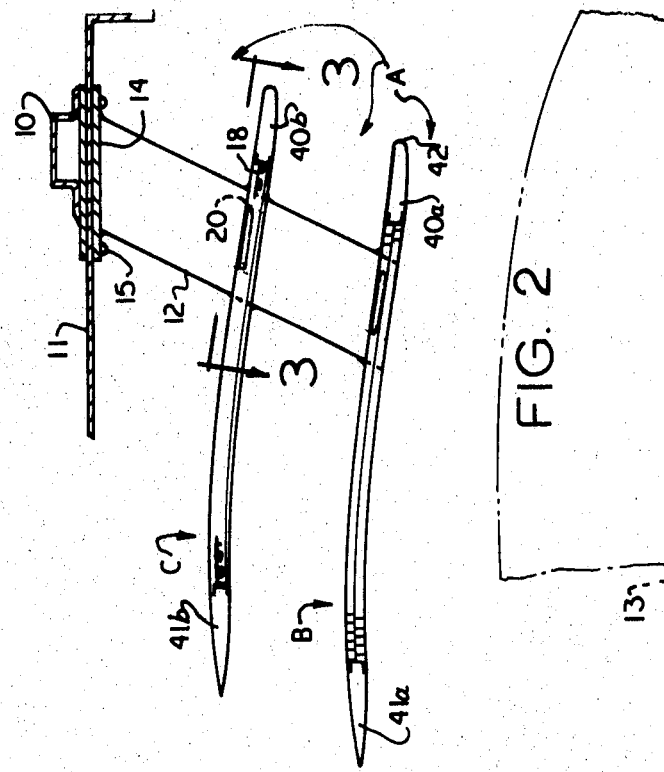
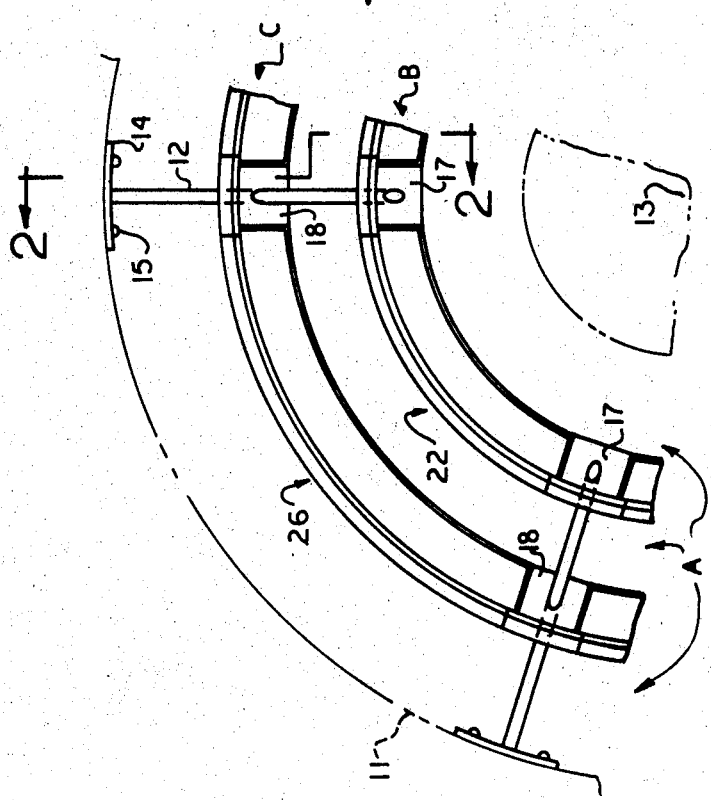
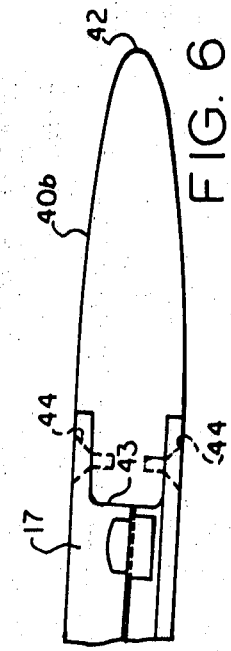
INVENTOR.
EDWARD M. SANKEY
BY George E. Pearson
ATTORNEY

INVENTOR
EDWARD M. SANKEY
BY
ATTORNEY

AIR DIVIDER RING STRUCTURE FOR JET ENGINE INLET AIR DUCT

BACKGROUND OF THE INVENTION

In recent years, the problem of suppressing jet engine noise has been a matter of extreme and increasing urgency. Legislation is now in effect aimed at reducing such noise, and strong forces are working toward even more stringent suppressive measures.

Two principal zones of a jet engine are responsible for most of the objectionable noise emission, one at the inlet end of the engine nacelle where the high-speed shearing effect of the fan and stator blades on the inrushing inlet air produces a high-pitched siren effect, and the other at the exhaust end where the high velocity exhaust gases have their shearing encounter with the ambient atmosphere.

It is well known that the amount of objectionable noise emanating from the intake end of a jet engine can be attenuated by increasing the internal surface area available for acoustical treatment, and it is not broadly new to mount one or more annular airfoil type members, called "splitter rings," coaxially within the intake duct. However, such rings present serious problems in that they must be rigidly and strongly mounted, with no danger of any portion thereof coming loose to be swallowed by the engine, while at the same time they should be easily removable, either in whole or in part, for inspection, maintenance or replacement.

SUMMARY OF THE INVENTION

It is a principal objective of this invention to mount one or more streamlined, sound absorptive, inlet air divider rings coaxially within the air inlet duct of a jet engine, the ring or rings being assembled in removable panel segments between longerons supported by radially extending struts.

BRIEF DESCRIPTION OF THE DRAWINGS

The foregoing objectives and advantages of the invention will be apparent from the following description and the accompanying drawings, wherein:

FIG. 1 is a fragmentary, front, elevational view of approximately one-quarter of a two ring assembly as it appears when looking into the upstream end of the intake duct of an engine nacelle in which the rings are mounted, the nacelle cowling being removed, the inner face of the cowling and the nose cone being indicated in broken lines;

FIG. 2 is a sectional view taken along offset line 2-2 of FIG. 1.

FIG. 5 is an enlarged side view of the downstream portion of one of the longerons; and FIG. 6 is an enlarged side view of a longeron nose portion.

DETAILED DESCRIPTION

Figure 3:
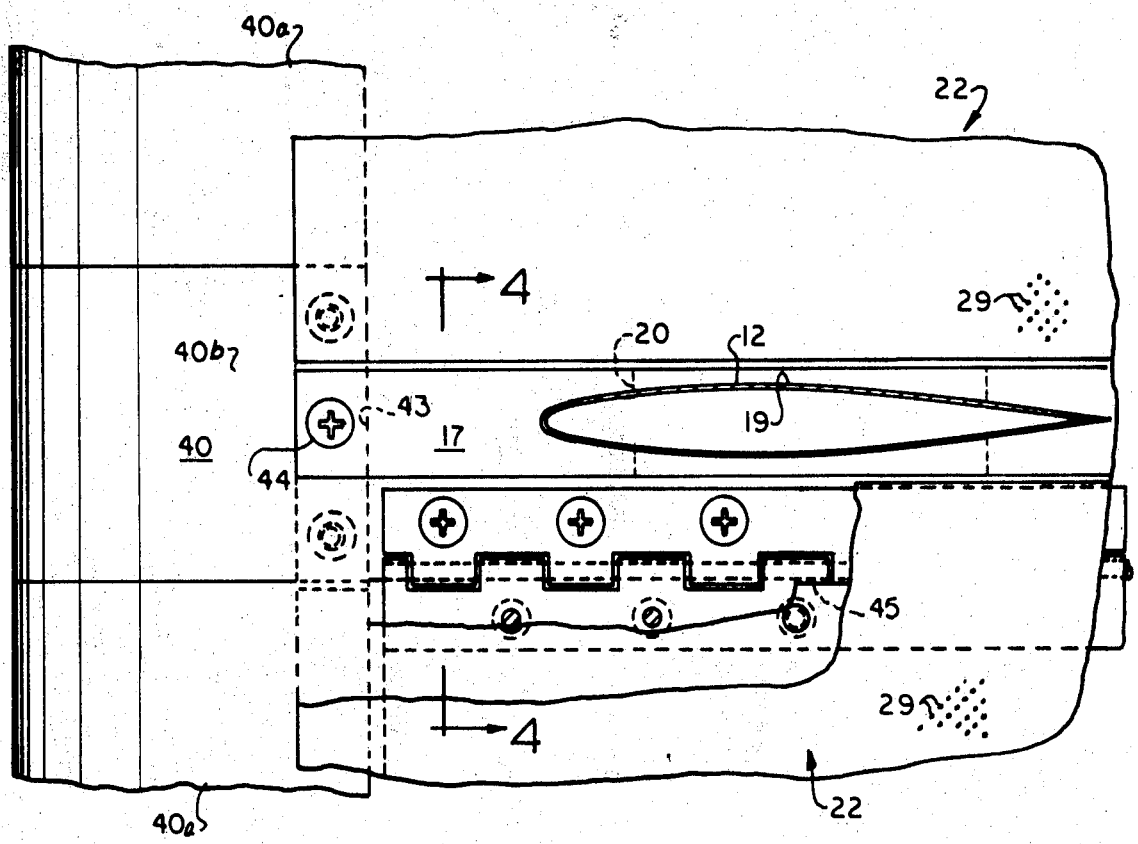
FIG. 3 is an enlarged, fragmentary, sectional view taken along line 3-3 of FIG. 2, portions being broken away to show the piano hinge-type connection between the honeycomb panels and the longerons.

Referring to the drawings in detail, the inlet duct A of a conventional jet engine nacelle is defined by a hat section reinforcing band 10, see FIG. 2, encircling a conventional cowling structure 11.

A plurality of five identical struts 12 of streamlined, longitudinal sectional shape are mounted in the inlet duct A along symmetrically angularly spaced radial planes from the inlet duct axis 13. Each strut 12 has a mounting plate 14 on its radially outward end secured to the cowling 11 by removable fasteners 15. Each strut 12 is hollow, and may be of drawn or extruded metal, or formed from suitable sheet metal such as stainless steel, titanium, or aluminum alloy. The struts 12, as shown in FIG. 2, are raked back toward their inner ends approximately 25° from a radius from the inlet duct axis.

Two longerons 17 and 18 are mounted on each strut 12, one longeron 17 being mounted on the radially inward end of the strut, and the other 18 at a desired or designed intermediate location. The longerons, like the air divider rings B and C of which they constitute narrow segments, are shaped in longitudinal section to conform to the normal flow of inlet air through the inlet duct A. Since both air divider rings B and C are generally similar to each other only the structural details of the inner ring B will be described in detail herein.

Figure 4:
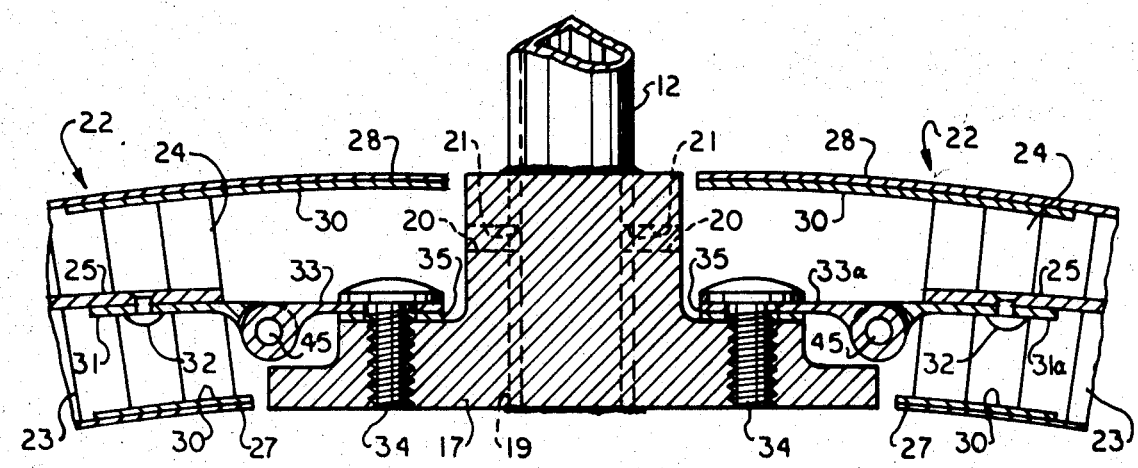
FIG. 4 is a further enlarged, fragmentary, sectional view taken along line 4-4 of FIG. 3.

Each longeron 17 is of generally inverted T cross-sectional shape as shown in FIG. 4, and has a strut receiving hole 19 therethrough, see FIGS. 3 and 4, shaped to receive the strut 12 in fitted relation therein. Each strut 12 is inserted a required distance in each of its two longerons 17 and 18 as shown in FIG. 2, and the longerons are welded to the strut around the top and bottom of each strut-receiving opening in each longeron.

An elongated open 20, see FIGS. 2 and 4, is provided in each side of each longeron to open into the hollow interior of the struts mounted therein, and a matching opening 21, see FIG. 4, is provided in each side of each strut to register with these openings 20 in the longerons when the longerons are mounted on the strut. The openings thus provided into the hollow interior of each strut provide a path for anti-icing air.

A plurality of transversely curved, segmental, honeycomb panels 22 are fitted in complementary relation between the longerons 17, so that the complemental segments defined by the longerons 17 and panels 22 form the air divider ring B.

Each panel 22, as best shown in FIGS. 3 and 4, comprises two layers 23 and 24 of honeycomb core material in back-to-back relation on opposite sides of a common intermediate or backing layer 25, and a pair of face sheets 27 and 28, spaced from the backing sheet 25 by the honeycomb cores 23 and 24, respectively, to provide resonant cavities between the face sheets and the backing sheet. The two face sheets 27 and 28 are of light gauge metal, and have a multiplicity of small holes 29 therethrough, see FIG. 3, in an overall pattern in accordance with common practice for this type of sound absorptive material. Usual doubler strips 30 are provided along exposed marginal areas of the face sheets 27 and 28 for reinforcing. The face sheets 27 and 28, doubler strips 30, honeycomb cores 23 and 24 and the central-backing sheet 25 are secured together in closely superposed relation as shown in FIGS. 2 and 4 by conventional means, such as brazing. Distinguishing the structure of the panels 22 from usual practice is the thickness of the central backing sheet 25, which is of relatively thick, structural sheet material.

For mounting the panels 25 between adjacent longerons 17, each panel 25 has two half portions 31 and 31a, see FIGS. 3 and 4, of a piano hinge-type member firmly secured, by rivets 32 or other suitable means, such as bonding or brazing, one to each lateral edge thereof. The complementary half portions 33 and 33a of said piano hinge-type members are secured, respectively, by machine screws 34 to the lateral offset or head portions 35 and 35a of each inverted T-shaped longeron 17. A shim strip 35 of selected thickness is interposed between each longeron hinge half portion 33 and 33a and its associated longeron 17 to bring the face sheets of the panel flush with the faces of the longeron laterally adjacent thereto. The outer face sheet 28 of each panel 22 and its doubler strip 30 extends beyond the core 24 a sufficient distance to substantially close the gap between the face sheets 28 and the stem portion of the inverted T-shaped longeron 17. The abutments of the piano hinge-type half portions 33 and 33a of each longeron 17 are so positioned, relative to the abutments on the piano hinge-type half portions on the panels 22 to which they are connected as to fit therebetween in relatively interdigitated relation, with the hinge pin holes in both sets of abutments in substantial alignment with each other to receive a hinge pin 45 to securely attach the panels in complementary relation between the respective longerons.

Streamlined terminal fairings 40 and 41 are provided on the upstream and downstream ends, respectively, of both air divider rings B and C. The nose fairing 40 for the upstream or leading edge of the ring B comprises a plurality of longeron nose portions 40a, and panel nose portions 40b.

Each longeron nose portion 40b, see FIGS. 3 and 6, is of the same width as the base of the longeron 17 upon which it is mounted, and is rounded at its leading end 42, see FIG. 6. The downstream end of each longeron nose fairing 40b is fitted into a notch 43, see FIG. 6, provided therefor in the upstream end of its associated longeron 17, and is connected thereto by screws 44. Each longeron nose fairing 40b fits flush with the outer surfaces of its respective longeron.

A panel nose fairing 40a, generally similar in longitudinal section to the longeron nose fairing 40b, is secured in a notch provided therefor in the leading edge of each panel.

Tail fairings 41a and 41b are similarly mounted in the downstream end of each longeron 17 and panel 22, the downstream end of each tail fairing terminating in a usual edge 47. The nose and tail fairings in the longerons 17 and panels 22 fit together in edge-to-edge, complementary relation as shown in FIGS. 1 and 3 to comprise annular fairings in flush, interfitted relation with their respective longerons and panels.

OPERATION

The illustrative two inlet air divider ring assembly, comprising the five struts 12 with their two sets of longerons 17 and 18, and two sets of complementary, interfitted panels 22 and 26, with their nose and tail fairings mounted thereon, is mounted coaxially in the inlet air duct A of a jet engine nacelle, and is fixedly secured therein by the rivets 32 or other suitable mounting means. Any instrumentation required is usually accomplished before assembly and installation, and the instrument wires are brought into one or more selected struts 12 through aligned openings 20 and 21, and thence outwardly through the outer ends of the struts.

In the event that maintenance or inspection subsequently requires the removal of one or more of the panels 22 or 26, the longeron nose fairings 40b or the tail fairings 41b, or both, of the longerons on each side of each such panel are removed, and the hinge pins 45 are withdrawn, thereby freeing the panel or panels for removal. The panel or panels, or replacements therefor, are replaced by reversing the foregoing procedure.

The invention provides a strong, safe, rigid, annular air divider or "splitter ring" structure which adds substantially to the area available within the inlet duct for sound absorptive treatment, does not substantially affect either engine performance or drag, has no loose parts apt to become dislodged and swallowed by the engine, and does not weaken the nacelle structure.

I claim:
1. An inlet air divider ring for a jet engine comprising:
a plurality of longerons mounted within the inlet duct of a jet engine at selected, equal, radial distances from the longitudinal axis of the intake duct, said longerons comprising segments of a streamlined air divider ring disposed coaxially of the inlet duct;
a panel-mounting half element having a plurality of perforated, aligned, spaced-apart abutments thereon mounted along each lateral edge of each longeron;
a curved panel of sound absorptive material comprising a complementary segment of such streamlined air divider ring fitted between each two adjacent longerons;
a panel-mounting other half element having a plurality of perforated, spaced-apart abutments thereon mounted along each lateral edge of each panel with the abutments thereof fitted in interdigitated relation between the abutments on the panel mounting half element on the longeron laterally adjacent thereto, the perforations in both pluralities of interdigitated abutments being aligned; and a fastening pin inserted through the aligned perforations in the abutments of each longeron-mounted half element and the interdigitated abutments of its associated other half element to attach the panels in complementary relation to the longerons.

2. An inlet air divider ring as claimed in claim 1 wherein an equal plurality of said longerons are mounted at symmetrically radially spaced intervals within said inlet duct with each plurality of corresponding longerons comprising a set of longerons, the longerons of each set being spaced equally from the air inlet duct axis and comprising segments of a streamlined air divider ring, and a said panel comprising a supplemental segment of each such divider ring is fitted between each two adjacent longerons of each set of longerons to form a plurality of coaxial, streamlined air divider rings mounted coaxially within the air inlet duct.

3. An inlet air divider ring for a jet engine comprising:
a plurality of generally radially extending struts mounted within the air inlet duct of a jet engine nacelle;
a longeron mounted on each strut at a common radial distance from the longitudinal axis of the intake duct, said longerons comprising segments of a streamlined air divider ring disposed coaxially within the inlet duct;
a plurality of perforated panel mounting abutments secured in spaced-apart, aligned relation along each lateral edge of each longeron;
a curved honeycomb panel comprising a complementary segment of such streamlined air divider ring fitted between each two adjacent longerons, each panel comprising a layer of honeycomb core material, a backing layer of sheet material of substantial structural strength on one end of said core material, and a sound pervious facing on the other end of said core material;
another plurality of perforated abutments secured in aligned relation along each lateral edge of each said backing sheet, each plurality of said other abutments being spaced-apart and fitted in interdigitated relation between the abutments of a longeron laterally adjacent thereto with the perforations in both pluralities of interdigitated abutments aligned; and
a fastening pin inserted through the aligned perforations of each such two pluralities of interdigitated abutments.

4. An inlet air divider ring as claimed in claim 3 wherein each honeycomb panel comprises a central layer of relatively heavy sheet material of substantial structural strength and stiffness, a layer of honeycomb core material is applied to each side of said central layer, a sound pervious facing is provided on the outer end of each layer of core material, and said latter abutments are secured in aligned relation along each lateral edge of the central layer of each panel.

5. An inlet air divider ring as claimed in claim 3 wherein an annular nose fairing is fitted in conforming relation into the upstream ends of said longerons and said panels in position to cover the upstream ends of said pins and restrain them from forward displacement.

6. An inlet air divider as claimed in claim 5 wherein the nose fairing ring is assembled from a plurality of supplemental segments, one segment being mounted on the upstream end of each longeron, and one segment being mounted on the upstream end of each panel, selected ones of said segments being removable.

7. An inlet air divider ring as claimed in claim 3 wherein a tail fairing is fitted in conforming relation onto the downstream ends of said longerons and said panels.

8. An inlet air divider ring as claimed in claim 7 wherein the tail fairing is assembled from a plurality of supplemental segments, one segment being mounted on the downstream end of each longeron and one segment being mounted on the downstream end of each panel, selected ones of said segments being removable.